United States Patent Office 3,084,053 Patented Apr. 2, 1963

3,084,053

CERAMIC MATERIALS AND METHOD FOR MAKING SAME

Robert H. Arlett, New Brunswick, Salvatore Di Vita, West Long Branch, and Edward J. Smoke, Metuchen, N.J., assignors to the United States of America as represented by the Secretary of the Army No Drawing. Filed May 13, 1960, Ser. No. 29,124
1 Claim. (Cl. 106—39)

This invention relates to ceramic bodies and, more particularly, to a new and improved method for producing dense, crystalline ceramic bodies having low moisture absorption, mechanical strength, and improved electrical properties.

At the present time, several different methods are employed by the ceramics industry in producing ceramic bodies suitable for use as electrical insulators. The most common of these methods is to make a ceramic batch by mechanically mixing pulverized non-plastic, refractory crystals, such as alumina, with suitable plastic materials, such as clay or kaolin, and appropriate fluxes. This mixture is then fabricated into ceramic articles by a number of techniques including pressing, extruding, and casting. The articles thus formed are then fired to produce the desired porcelain or ceramic articles.

When ceramic bodies are prepared by the above solid phase reaction method, the fluxes and plastic ingredients soften or melt during the firing stage to form a glass which binds or cements together the whole ceramic mass usually leaving the crystalline or refractory components unaffected or only slightly affected by the solution of the non-refractory components. This is due to the fact that the refractory materials are introduced into the raw ceramic batch as finely ground particles of their original cystalline forms and do not have further growth since they remain in a stable and undissolved state. In some solid phase reactions some new crystal growth takes place, but the fired bodies still contain a large percentage of glass cementing the crystals together and crystal growth is discontinuous. Thus, the fired bodies depend for their mechanical and dielectric strength to a large extent upon the fired strength of the plastic ingredients which cement the refractory ingredients together.

Ceramic bodies prepared in this manner exhibit poor physical and electrical properties, especially at high frequencies. This is primarily due to the low density of the bodies which have a density ranging between 75% and 90% of the theoretical density attainable. Or, in other words, the vitrified ceramic bodies prepared by solid phase reaction contain between 10% and 25% voids which makes them unsuitable for many present high-frequency applications. This relatively low value of density is believed due to the type of raw materials used and inadequate mixing attainable by the method of preparation used. This manifests itself, in fabricated specimens, as poor particle packing, entrapment of air, development of gases during firing, etc. The obvious effect is poorer physical and electrical properties than the composition is capable of producing; also voids result in the surface of the body if such ceramics are ground to dimension after firing.

It has long been known that if crystalline formation in the final fired body could be increased with minimum formation of glass, a product of increased density, and therefore having fewer voids, would result having increased strength, better electrical properties, and better resistance to heat shock. One method for forming a dense polycrystalline structure has been proposed in which the refractory material is fused and then cooled in such a manner as to form an unstable crystalline material having minute crystals and glass associated therewith. This material is then ground and mixed with plastic material to form a raw ceramic batch, and articles are formed from this batch and fired in the usual manner. The fired bodies exhibit improved crystalline structure but still contain a high percentage of voids and consequently exhibit poor electrical properties and are inadequate for many high-frequency applications.

Prior to this invention, the only method for producing dense, crystalline ceramics suitable for high-frequency insulators was to make them from a glass by the use of nucleating agents and a critical heat treatment. The nucleating agents are ions of titanium dioxide or noble metals such as gold or platinum and are added to the glass batch which is then melted, formed into articles by conventional glass-forming methods, such as pressing, blowing, etc., and cooled. After the articles have cooled they are heat treated in critical heat cycles in which growth of the nucleated crystals takes place. The resultant product is a dense crystalline ceramic. The primary disadvantages of this method from the economic standpoint are the use of expensive noble metals as nucleating agents and that the final heat treating steps are very critical and cause the ceramic articles thus formed to be expensive. Also, the process can only be used for forming simply shaped articles in a molten or melted state which renders it useless in the manufacture of ceramic articles of complicated shapes which must be formed prior to firing.

Accordingly, it is a primary object of this invention to provide a simple process for making dense, crystalline ceramic bodies from conventional batch ingredients without the use of additional nucleating agents.

Another object of this invention is to provide a simple process for forming dense, crystalline ceramics of intricate shape.

Ceramic bodies made according to this invention are characterized by having high crystal content and an improvement in physical strength, up to 80% over bodies of the same composition made by the conventional solid phase reaction; and electrical properties are significantly improved over those of solid phase reacted bodies. The void content of bodies made by the process of this invention has been decreased markedly, and a density 99.7% of theoretical density has been attained. It is anticipated that refinements in the apparatus and technique used will increase the density attainable even more. Some of the bodies also have been found to possess a high resistance to thermal shock.

The general method of preparing ceramic bodies according to the invention is the same irrespective of the composition used. First, all the ingredients, plastic and non-plastic, are pulverized and thoroughly mixed in any suitable conventional mixer. After this mechanical mixing, the batch is melted or fused to complete the mixing on an atomic basis. The melting temperature must be high enough to melt all the compounds and minerals which make up the ingredients of the batch. In the preferred embodiment the melt is then fritted or slowly dropped into cold water where it is rapidly cooled or quenched to form a glass or frit; however, other rapid cooling means could be used. This frit is completely vitreous with no crystals present. The frit is then ground to pass fine mesh, and this pulverized frit or glass then becomes the sole ingredient from which the desired ceramic bodies are fabricated. All conventional ceramic fabricating techniques including pressing, extruding, and casting can be used to form ceramic articles. The articles are then dried in air and fired conventionally. During firing the frit devitrifies, i.e., it allows crystals to form from the glass and results in a dense, crystalline ceramic body which is superior to the quality of ceramics prepared by conventional methods.

This process is applicable to any ceramic materials that can be formed into a frittable, devitrifiable glass and is especially suited to the manufacture of dielectrics although ferroelectrics and ferromagnetics can also be made in this manner.

The characteristics of several types of bodies prepared by the process of this invention will now be discussed. The first of these is lead aluminosilicate which was prepared from a mixture comprising 4.8% alumina, 26.6% clay (kaolin), and 68.6% lead bisilicate by weight. The raw ingredients were thoroughly mixed and then melted at a temperature of approximately 2460° F. and fritted continuously into water at room temperature. The frit was then dried and ground to pass a 200 mesh screen. This pulverized frit was then V-blended for 10 to 15 minutes and approximately 6% moisture was added in order to form semi-dry pressed specimens 1.35 inches in diameter and 0.75 inch thick. The specimens were allowed to dry in air and were then fired in an electric kiln at a maturation temperature of 1600° F.

A lead aluminosilicate body having the same ingredients in the same proportions was prepared by the conventional solid phase reaction for control purposes and was fired to a maturation temperature of 1800° F.

The following characteristics for the lead aluminosilicate bodies thus formed were observed:

*Method of Invention*

| | (Devitrified) | Solid Phase Reaction |
|---|---|---|
| Moisture Absorption (percent) | 0.00 | .20 |
| Fabricated Bulk Density | 2.55 | 3.03 |
| Fired Bulk Density | 3.81 | 3.14 |
| Weight Loss | 0.18 | 3.99 |
| Modulus of Rupture, p.s.i | 10,000 | 5,800 |
| Dielectric Constant (1 mc.) | 9.44 | 5.8 |
| Power Factor | 0.00062 | 0.0011 |
| Loss Factor | .0058 | .0060 |

The true or theoretical density of the lead aluminosilicate formed is 3.818. Thus, it is apparent that the devitrified body prepared according to the invention having a fired density of 3.81 attained 99.7% of the theoretical density while the composition formed by conventional techniques attained only 82.5% of the theoretical density. Thus the solid phase body contains 17.5% voids while the frit body prepared according to the invention contains practically no voids. A petrographic analysis revealed that the crystal formation from the frit body was far superior to that developed by the solid phase reaction, and that the crystal content of the frit body was increased while the glass and void content was decreased markedly. The strength also exhibited a marked improvement with the frit body being 60% stronger than the solid phase body.

Lithium aluminosilicate ceramic bodies and magnesium lithium aluminosilicate bodies made according to the invention also exhibited remarkably improved characteristics. The lithium aluminosilicates were formed from a mixture containing lithium carbonate 14.88%, clay 49.98%, and flint 35.14% by weight. The devitrified ceramic bodies produced by the method of the invention from this mixture exhibited a negative or zero temperature coefficient of thermal expansion up to 500° C. and were subjected to extremely high thermal shock (20 cycles from 1200° F. into tap water) without fracture. The bodies were prepared from the above mixture by three different methods: (1) by solid phase reaction of the raw ingredients, (2) by preparing a frit of the lithium carbonate and flint with a small amount of clay and then mixing this frit with the rest of the clay for final firing, and (3) according to the invention by making a frit of the entire composition which was then ground prior to forming and firing. The following characteristics for the lithium aluminosilicate bodies formed by the three methods were observed:

| | Solid Phase Reaction of Raw Ingredients | Partially Fritted Solid Phase | Method of invention (devitrified) |
|---|---|---|---|
| Firing Temperature (° F.) | Would Not Vitrify. | 1950 | 2300 |
| Moisture Absorption (Percent) | | 0.23 | .08 |
| Bulk Density (g./cc.) | | 1.81 | 2.24 |
| Percent of True Density | | 78.8 | 93.0 |
| Modulus of Rupture (p.s.i.) | | 7590 | 11,000 |
| Dielectric Constant (1 mc.) | | -------- | 6.41 |
| Power Factor | | -------- | .0039 |
| Loss Factor | | -------- | .0256 |

Again it is noted that the devitrified bodies prepared according to the invention exhibit significantly improved characteristics over bodies of the same composition prepared by prior art methods. No tests could be run on bodies formed by solid phase reaction of the raw ingredients since these bodies did not vitrify upon firing. The electrical properties of the partially fritted bodies were so poor that tests were not completed for these properties. For example, the loss factor of the partially fritted bodies was ten times that of the totally fritted devitrified bodies made according to the invention. In all respects, physical and electrical, it can be seen that the devitrified lithium aluminosilicate dielectrics made according to the invention are markedly superior to those made by other methods. These devitrified bodies also exhibited excellent crystallization (80 to 85%).

The improved electrical properties are believed due to the fact that a high percentage of the loss producing ions are tied up in the crystalline phase.

Several magnesium lithium aluminosilicate ceramic bodies were prepared by the method of the invention by substituting various percentages of magnesium carbonate for lithium carbonate in the above mixture. The mixtures prepared contained between 3.84% and 14.88% of lithium carbonate, 0.00% to 9.82% magnesium carbonate, 35.14% to 36.72% flint, and 49.19% to 49.98% clay by weight. The firing temperatures for bodies prepared from the frits of these mixtures ranged between 2050° F. and 2320° F. The moisture absorption was between 0.00% and 10%. The crystal phase present was beta-spodumene.

The dielectric constants of bodies made by the process of the invention are approximately the same as the dielectric constants of bodies made from the same initial ingredients by conventional techniques. However, the dielectric constants of ceramic bodies made according to the invention are made much more uniform by the superior structure of the material which is homogeneous throughout.

The loss factor of these bodies was about 1/10 of that of the conventially prepared bodies and ranged from a low of .0110 to a high of .0850. The power factor ranged between .00159 and .0153 for the different mixtures used. The frequency range for the above measurements was 1 mc. to 2.5 mc.

The use of the process of this invention has also made possible the formation of boron phosphate-silica ($BPO_4$—$SiO_2$) ceramics which could not be fabricated by the prior art solid phase reactions because the boron phosphate tended to volatilize. Samples containing between 55 to 62% silica and 45 to 38% boron phosphate were fabricated according to the invention and exhibited the following electrical characteristics for the two extreme mixtures of this range:

| | 55% $SiO_2$ 45% $BPO_4$ | 62% $SiO_2$ 38% $BPO_4$ |
|---|---|---|
| Power Factor | .0002 | .00037 |
| Dielectric Constant | 4.3 | 5.06 |
| Loss Factor | .00086 | .0019 |

These values compared very favorably with a very good grade of fused silica which had a power factor of .0002, a dielectric constant of 3.78, and a loss factor of .00076. The operating temperatures of the boron phosphate-silica ceramics thus produced are higher than those of fused silica which should make them valuable in many applications.

As stated previously, devitrified ferroelectric ceramics can also be made by the method of the invention. Various devitrified barium titanate compositions were prepared comprising 85 to 91% barium titanate ($BaTiO_3$) and 9 to 15% boric acid ($B_2O_3$) by weight. The electrical characteristics of the bodies produced were tested over a frequency range between 50 kc. and 2 mc. Unlike conventionally prepared barium titanate ferroelectric compositions which exhibit electrical characteristics that vary greatly with frequency, the devitrified bodies had constant dielectric constants and constant powers factors over the entire range of frequencies. The bodies were not frequency sensitive and exhibited little or no change in capacity over the entire frequency range used in the tests.

It is felt that the crystal content of ceramics prepared by this new method can be significantly increased with a corresponding decreases in the percentage of glass and voids by using longer soak times at the optimum maturing temperature or appropriate variations in the heating and cooling curves from those used in preparing the original laboratory samples. The improvement in electrical properties is due to the excellent mixing of the formula on an atomic basis during the fritting operation and improved crystallization and minimum glass formation during the firing operation.

While lead bisilicate, lithium carbonate, and magnesium carbonate were used as the basic ingredients in the examples given, it is to be understood that lead oxide or lead monosilicate, and the oxides or hydroxides of lithium and magnesium could have been used as well.

It is to be further understood that the examples given are merely illustrative and that the invention is applicable to a wide range of ceramic bodies, so long as the basic ingredients can be formed into a frittable, devitrifiable glass. Various modifications and applications may be made without departing from the spirit and scope of the invention as set forth in the appended claim.

What is claimed is:

A method of making dense, crystalline lead aluminosilicate ceramic bodies consisting of (1) mechanically mixing a ceramic batch consisting of 4.8 percent by weight of alumina, 26.6 percent by weight of kaolin, and 68.6 percent by weight of lead bisilicate, (2) melting the batch at a temperature of approximately 2460° F., (3) cooling the melt to form a vitreous frit, (4) finely grinding the frit, (5) fabricating the finely ground frit into a ceramic body, (6) drying the body in air, and (7) firing the ceramic body at a temperature of 1600° F.

References Cited in the file of this patent

UNITED STATES PATENTS

| | | |
|---|---|---|
| 2,424,111 | Navias | July 15, 1947 |
| 2,480,672 | Plank | Aug. 30, 1949 |
| 2,920,971 | Stookey | Jan. 12, 1960 |
| 2,932,922 | Mauritz | Apr. 19, 1960 |
| 2,956,219 | Cianchi | Oct. 11, 1960 |
| 2,960,802 | Voss | Nov. 22, 1960 |
| 2,968,622 | Whitehurst | Jan. 17, 1961 |
| 2,971,853 | Stookey | Feb. 14, 1961 |
| 2,972,176 | Gravley | Feb. 21, 1961 |
| 2,980,547 | Duval d'Adrian | Apr. 18, 1961 |
| 3,000,745 | Cianchi | Sept. 19, 1961 |
| 3,006,775 | Chen | Oct. 31, 1961 |

OTHER REFERENCES

Hinz: Chemical Abstracts, Item 12615c, July 10, 1959.